(12) United States Patent
Good

(10) Patent No.: US 8,408,469 B2
(45) Date of Patent: Apr. 2, 2013

(54) LASER SCANNING ASSEMBLY HAVING AN IMPROVED SCAN ANGLE-MULTIPLICATION FACTOR

(75) Inventor: Timothy Good, Clementon, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 153 days.

(21) Appl. No.: 12/899,930

(22) Filed: Oct. 7, 2010

(65) Prior Publication Data

US 2012/0085825 A1    Apr. 12, 2012

(51) Int. Cl.
*G02B 26/00* (2006.01)

(52) U.S. Cl. .......... 235/462.38; 235/462.39; 235/462.43

(58) Field of Classification Search ............. 235/462.38, 235/462.39, 462.43, 462.24
See application file for complete search history.

(56) References Cited

U.S. PATENT DOCUMENTS

| | | | |
|---|---|---|---|
| 3,958,104 A | 5/1976 | Zuckerman | |
| 3,978,317 A | 8/1976 | Yamaguchi et al. | |
| 3,988,573 A | 10/1976 | Hayosh et al. | |
| 4,560,862 A | 12/1985 | Eastman et al. | |
| 4,575,625 A | 3/1986 | Knowles | |
| 4,794,238 A | 12/1988 | Hampton | |
| 4,939,355 A * | 7/1990 | Rando et al. | 235/462.14 |
| 4,939,356 A | 7/1990 | Rando et al. | |
| 4,967,076 A | 10/1990 | Schuhmacher et al. | |
| 4,971,410 A | 11/1990 | Wike, Jr. et al. | |
| 5,039,184 A | 8/1991 | Murakawa et al. | |
| 5,115,121 A | 5/1992 | Bianco et al. | |
| 5,177,347 A | 1/1993 | Wike, Jr. | |
| 5,512,740 A | 4/1996 | Hone et al. | |
| 5,801,370 A | 9/1998 | Katoh et al. | |
| 5,886,336 A * | 3/1999 | Tang et al. | 235/462.43 |
| 6,006,993 A | 12/1999 | Dickson et al. | |

(Continued)

FOREIGN PATENT DOCUMENTS

| EP | 0551666 A | 7/1993 |
|---|---|---|
| EP | 0553504 A1 | 8/1993 |

(Continued)

OTHER PUBLICATIONS

European Search Report issued in European Application EP 11 18 4007 dated May 30, 2012.

(Continued)

*Primary Examiner* — Ahshik Kim
(74) *Attorney, Agent, or Firm* — Summa, Additon & Ashe, P.A.

(57) ABSTRACT

A laser scanning system for generating a laser scanning pattern in a scanning field, while amplifying the scan-angle multiplication factor of rotating mirrors employed therein. The laser scanning system employs rotatable laser scanning assembly having an axis of rotation and first and second rotating mirrors with normal vectors that are coplanar with each other and said rotational axis, and which form an acute angle substantially less than 90 degrees so as to provide a laser scanning assembly with a scan angle multiplication factor that is greater than 2.0. A cluster of stationary mirrors mounted about the first and second rotating mirrors, for sweeping a laser beam off the cluster of stationary mirrors after a laser beam has been reflected off the first rotating mirror, then reflected off the second rotating mirror, and then directed outwardly towards an array of pattern mirrors, so as to generate a resultant laser scanning pattern within the scanning field.

16 Claims, 6 Drawing Sheets

U.S. PATENT DOCUMENTS

| | | | |
|---|---|---|---|
| 6,045,046 A * | 4/2000 | Detwiler | 235/114 |
| 6,742,709 B2 | 6/2004 | Blake et al. | |
| 6,971,579 B2 * | 12/2005 | Barkan et al. | 235/462.38 |
| 7,177,347 B2 | 2/2007 | Terashima et al. | |
| 7,198,195 B2 * | 4/2007 | Bobba et al. | 235/462.38 |
| 7,341,192 B2 * | 3/2008 | Good | 235/462.34 |
| 7,866,558 B2 | 1/2011 | Good | |

FOREIGN PATENT DOCUMENTS

EP        0700013 A2     3/1996

OTHER PUBLICATIONS

Examination Report issued in European Application EP 11 18 4007 dated Jul. 10, 2012.

\* cited by examiner

LASER SCANNING ASSEMBLY HAVING AN IMPROVED SCAN ANGLE-MULTIPLICATION FACTOR

BACKGROUND

1. Field

The present disclosure relates to optical scanning devices and more particularly to a new and improved laser scanning assembly having an improved angle multiplication factor.

2. Brief Description of the State of the Art

In many laser scanning bar code symbol readers, employing multi-line laser scanning patterns, a faceted mirror with a set number of sides facing generally different directions (i.e. a polygon) is used as the scanning element.

However, a disadvantage of the polygon scanning element employed in such prior art scanning systems is that the achievable sweeping scan angle of a laser beam reflected off of such a scanning polygon can be no greater than two times the angle of rotation, and is usually less than two times. Also, in order to approach the limiting factor of two, the incident laser beam as well as the normal vectors to the mirror surfaces must be nearly perpendicular to the rotation axis. This prevents the laser beam from sweeping through a full 360 degree circle. To achieve a full circle of coverage with a single beam, the beam needs to be parallel to the rotation axis, with a single rotating mirror angled near to 45 degrees, but this reduces the maximum scan multiplication factor from two to one.

Additionally, traditional rotating polygons, with a scan multiplication factor near two, experience a loss of light collecting ability as they rotate away from a point of symmetry due to the narrowing of the apparent width of the mirror as it rotates. This happens if the polygon mirror is the limiting light-collection aperture of the system, which can be difficult to avoid in a traditional system design.

And while U.S. Pat. No. 5,177,347 discloses a polygon-based laser scanning system, in which a pair of rotating mirrors are used with a stationary cluster of mirrors, this laser scanning configuration does not amplify the scan angle multiplication factor of the pair of rotating mirrors beyond two, nor does it provide circular coverage.

Thus, there is great need in the art for a new and improved laser scanning assembly that is capable of generating a laser scanning pattern while amplifying the scan angle multiplication factor of the rotating mirrors beyond two, and thereby avoiding the shortcomings and drawbacks of the prior art scanning methods and apparatus.

OBJECTS AND SUMMARY

A primary object of the present disclosure is to provide a new and improved apparatus for and method of generating laser scanning patterns in bar code symbol scanners, while amplifying the scan-angle multiplication factor of the rotating mirrors.

Another object is to provide such an apparatus in the form of a rotatable laser scanning assembly comprising a pair of mirrors with normal vectors that are coplanar with each other and said rotational axis, and which form an acute angle substantially less than 90 degrees so as to increase the scan angle multiplication factor of the laser scanning assembly to be greater than 2.0.

Another object is to provide such a rotatable laser scanning assembly comprising first and second rotating mirrors, wherein, about the first and second rotating mirrors, a cluster of stationary mirrors are mounted for sweeping a laser beam off the cluster of stationary mirrors after the laser beam has been reflected off the first rotating mirror, and then reflect the laser beams from the stationary cluster off the second rotating mirror, and then directed outwardly towards an array of pattern mirrors or the like, to generate the resultant laser scanning pattern within a scanning field.

Another object is to provide a laser scanning system for generating a laser scanning pattern in a scanning field, while amplifying the scan-angle multiplication factor of rotating mirrors employed therein substantially greater than two.

Another object is to provide a rotatable laser scanning assembly allowing the scan angle multiplication factor of the rotating mirrors to be as high as three, while providing very uniform beam motion through a full 360 degrees around the laser scanning assembly.

Another object is to provide a rotatable laser scanning assembly having a scan angle multiplication factor well in excess of two times while simultaneously providing 360 degrees of scan coverage with a single beam and providing nearly uniform light collection through the limiting aperture of a cluster of stationary cluster mirrors.

Another object is to provide a rotatable laser scanning assembly allowing the laser scanning assembly to be physically larger than any individual cluster mirror, and consequently, allowing the light collection to be nearly uniform with scan angle, dropping less than 4% for a 30 degree scan sweep.

These and other objects will become apparent hereinafter and in the Claims.

BRIEF DESCRIPTION OF THE DRAWINGS

In order to more fully understand the objects, the following detailed description of the illustrative embodiments should be read in conjunction with the accompanying drawings in which.

DETAILED DESCRIPTION OF THE ILLUSTRATIVE EMBODIMENTS

Figure 1:
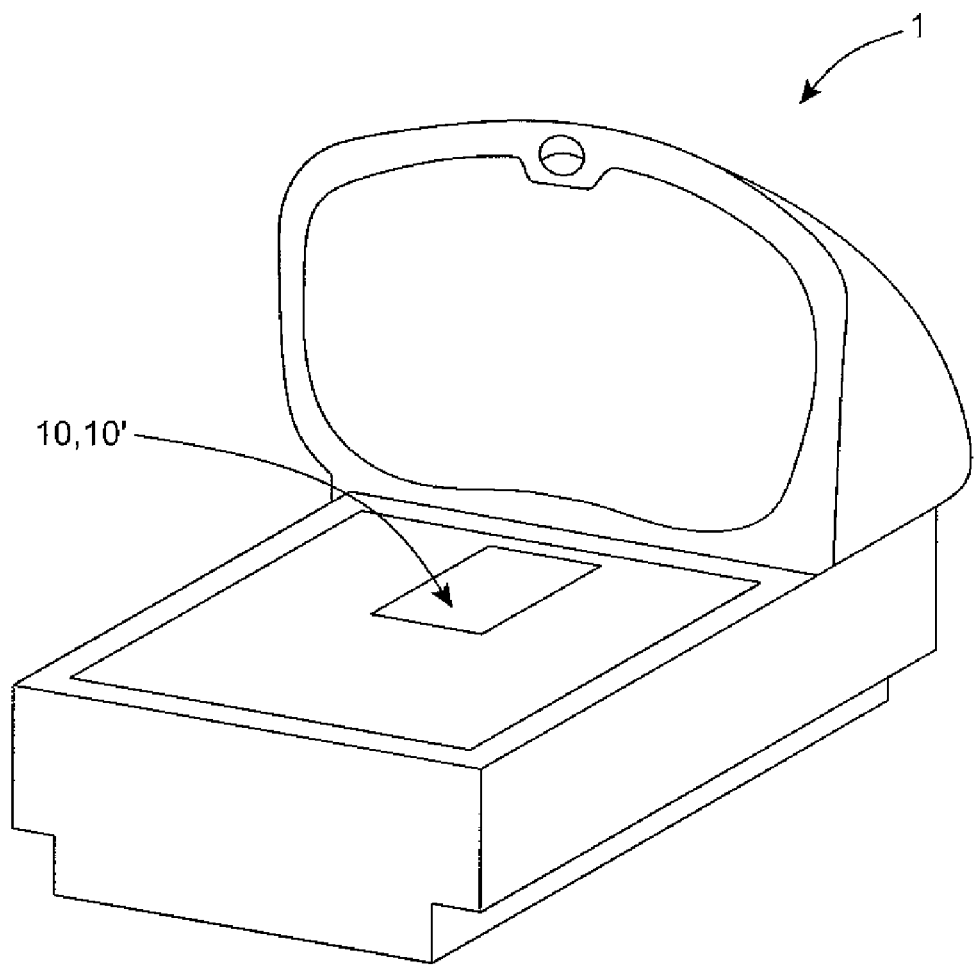
FIG. 1 is a perspective view of a laser scanning system in which the laser scanning assembly is installed for generating a laser scanning pattern within the scanning volume of the laser scanning system.

Referring to the figures in the accompanying drawings, the various illustrative embodiments of the present invention will be described in greater detail, wherein like elements will be indicated using like reference numerals.

In general, the laser scanning assembly of the present disclosure can be embodied in diverse kinds of optical scanning systems. For purposes of illustration, FIG. 1 shows the laser scanning assembly embodied in a point of sale (POS) laser scanning system 1. It is understood, however, that the laser scanning assembly 10, 10' can be installed in other types of laser scanning systems, including hand-supportable, POS-projection and industrial type laser scanning systems.

Figure 2:
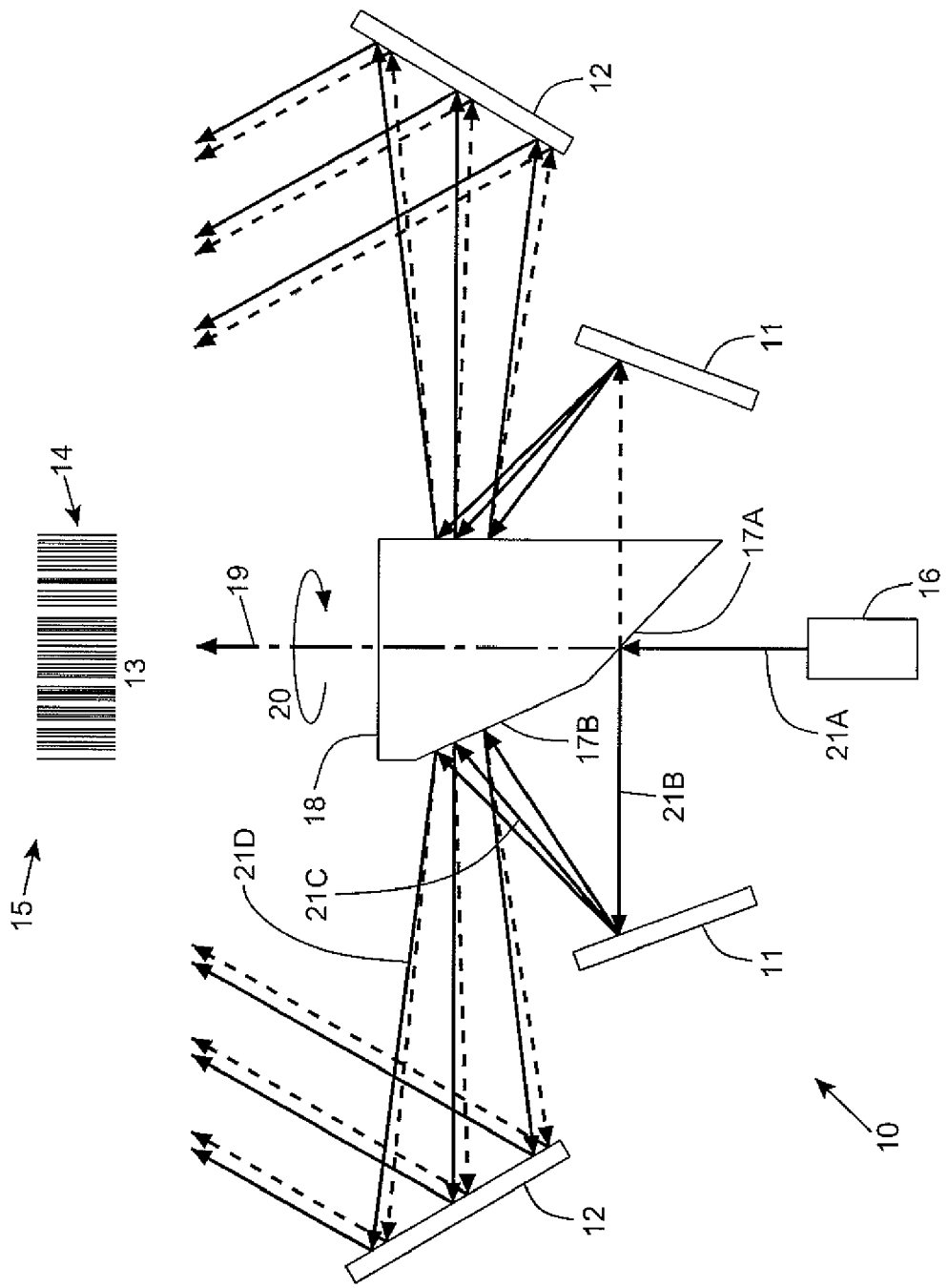
FIG. 2 is a schematic representation of the laser scanning assembly of the first illustrative embodiment, arranged within a first cluster of stationary mirrors, and in cooperation with a second cluster of stationary mirrors, generating a laser scanning pattern using a single laser beam source, as shown for example in FIG. 1.
Figure 3:
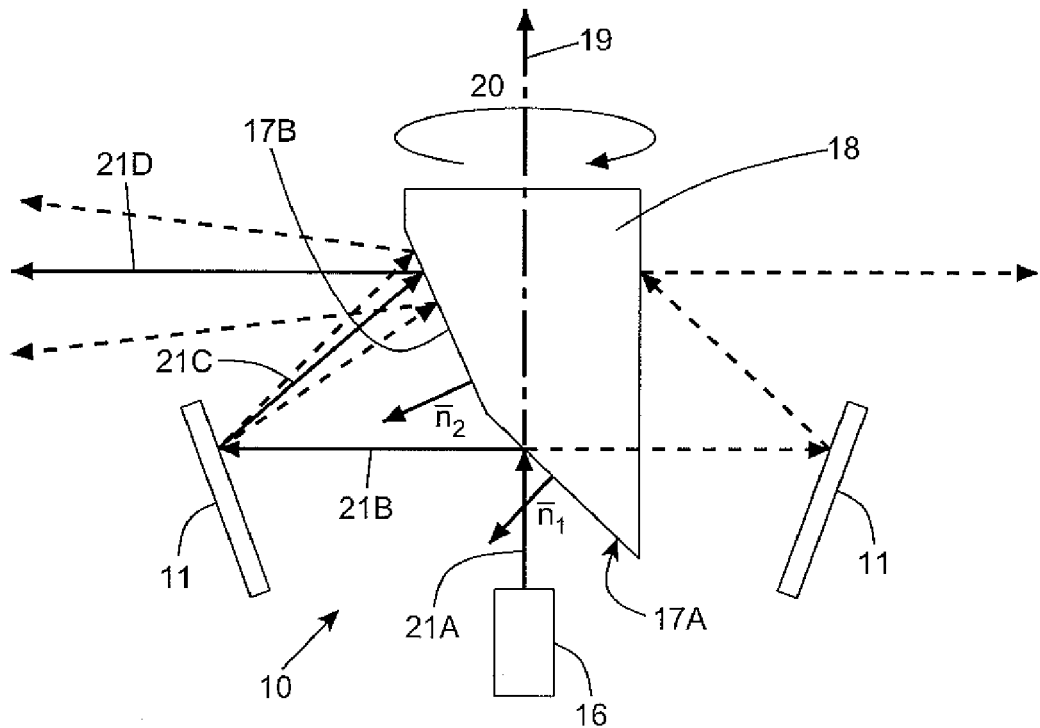
FIG. 3 is an enlarged cross-sectional view of a first illustrative embodiment of the laser scanning assembly, as shown configured in FIG. 2.

First Laser Scanning System Employing the Laser Scanning Assembly of the First Illustrative Embodiment FIGS. 2 and 3 show the laser scanning assembly of the first illustrative embodiment 10 configured in combination with a first cluster of stationary mirrors 11, disposed within a second cluster of stationary mirrors 12. Together, this arrangement generates a laser scanning pattern 13 for use in reading bar code symbols 14 in a scanning field 15, using a single laser beam source 16, in this particular illustrative embodiment.

Figure 4:
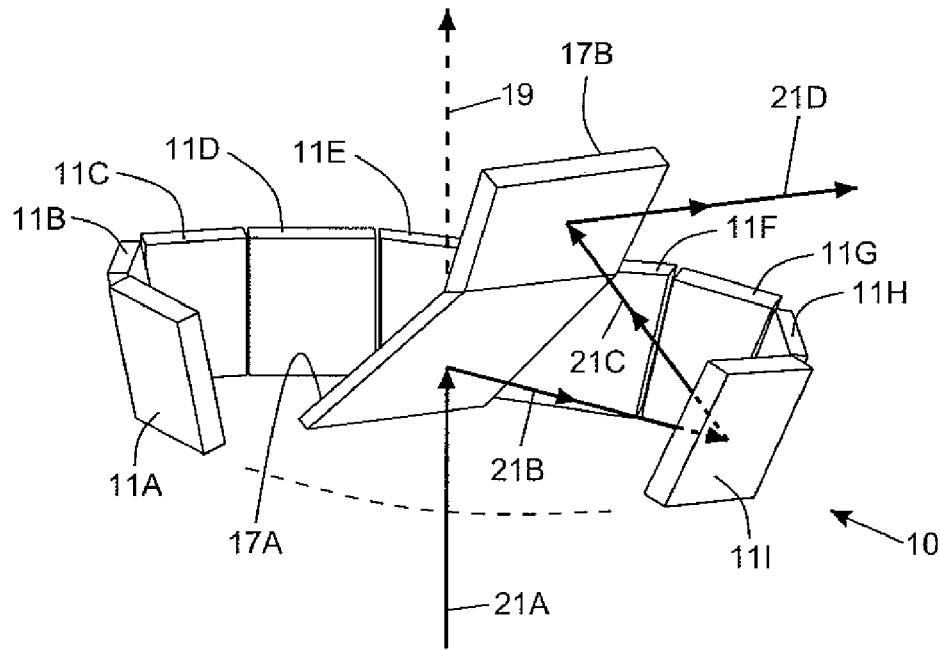
FIG. 4 is a schematic perspective view of a portion of the laser scanning system of FIG. 3 showing, for clarity purposes, several cluster mirrors removed from a first cluster of mirrors arranged about the laser scanning assembly, for projecting a first set of laser scanning beams towards and off the second rotating mirror of the laser scanning assembly, as the laser scanning assembly rotates about its axis of rotation.

In FIG. 3, the laser scanning assembly 10 is shown in greater detail as comprising first and second rotating mirrors 17A and 17B supported on support structure 18, and rotating about a common axis of rotation 19, by an electrical motor schematically depicted by reference numeral 20 in FIGS. 2, 3 and 4. These rotating mirrors 17A and 17B have normal vectors ☐ that are coplanar with each other and the rotational axis 19, such that there is an acute angle, substantially less than 90 degrees, between the two rotating mirrors 17A and 17B, while the two rotating mirrors are facing together in substantially the same direction, in the rotational sense. This acute angle increases the scan angle multiplication factor of the laser scanning assembly to be greater than 2.0, as will be illustrated in greater detail below.

In FIG. 4, the laser scanning assembly 10 is graphically illustrated in three dimensions, shown surrounded by the cluster of stationary mirrors 11, with a few cluster mirrors removed for clarity purposes, revealing the pair of rotating mirrors 17A and 17B on support structure 18 rotating about its axis of rotation 19, using electric motor 20. In FIG. 4B, the laser scanning assembly 10 is shown from a plan view, with the top edge of the second rotating mirror 17B being indicated by reference numeral 17B1.

As shown in FIG. 3, during the operation of the laser scanning system, a laser beam 21A is generated by a laser source 16 and is directed vertically up along the rotational axis of the laser scanning assembly toward its first rotating mirror 17A, reflecting off the first mirror 17A as laser beam 21B over to the stationary cluster of mirrors 11. This operation produces a planar 360 degree sweep of the laser beam. This sweep is then intercepted by the cluster of stationary mirrors 11 disposed around the periphery of the sweep. From the cluster of stationary mirrors 11, the laser beam 21C reflects up to the second rotating (spinning) mirror 17B, from which laser beam 21D is directed out towards a plurality of stationary pattern forming mirrors 12 mounted within the laser scanning system. Light reflected and/or scattered off the bar code symbol in the scanning field 15 returns along the same optical path of the exiting laser beam, reflecting off of all the same mirrors in reverse order, at which point the return laser light is collected by a photo detector (not shown in FIG. 4, but shown in FIG. 4 as 37, 40), and processed by a scan data signal processor and a decoder disposed within the laser scanning system, and which is well known in the art.

Notably, the dotted rays shown on the left side of FIG. 3 show the effect of angles for the stationary cluster mirrors 11. The dotted rays on the right side of FIG. 3 show the laser beam path after a 180 degree rotation of the pair of rotating mirrors 17A and 17B.

In the illustrative embodiment, the angle of the first mirror 17A is approximately 45 degrees, measured with respect to the axis of rotation, whereas the angle of the second rotating mirror 17B is about 20 degrees, measured with respect to the axis of rotation.

Also, as shown in FIG. 4, the cluster of stationary mirrors 11 in the first illustrative embodiment is preferably made up of 12 mirrors of equal size. In this configuration, each mirror intercepts 30 degrees of the beam sweep. Each of these stationary mirrors will be tilted at an angle around 20 degrees, specifically: mirrors 1, 4, 7, and 10 are oriented at 15 degrees; mirrors 2, 5, 8, and 11 are oriented at 20 degrees plus some small angle; and mirrors 3, 6, 9 and 12 oriented at 20 degrees minus some small angle. Based on these optical parameters, the resulting total scan angle multiplication factor for this embodiment of laser scanning assembly will be approximately 2.8, as computed by the following formula:

$$K_{sam} = \sin\theta_A + \sin\theta_B + \sin\theta_C + \sin\theta_D$$

where $\theta_A$, $\theta_B$, $\theta_C$, and $\theta_D$ are the angles of beams 21A, 21B, 21C, and 21D measured with respect to the rotation axis 19 of the rotating mirrors, illustrated in FIG. 2.

Also, the resulting laser scanning pattern will be an almost continuous, 360 degree raster of three lines with one line being broken approximately every 30 degrees. By virtue of this scan angle multiplication factor enabled by the laser scanning assembly of the illustrative embodiment, this laser raster can then be intercepted by a second cluster or arrangement of any variety of stationary pattern mirrors, disposed outside the first cluster of stationary mirrors 11, and directed out into the scanning field 15 in which the bar code symbol 14 is present.

Figure 4A:
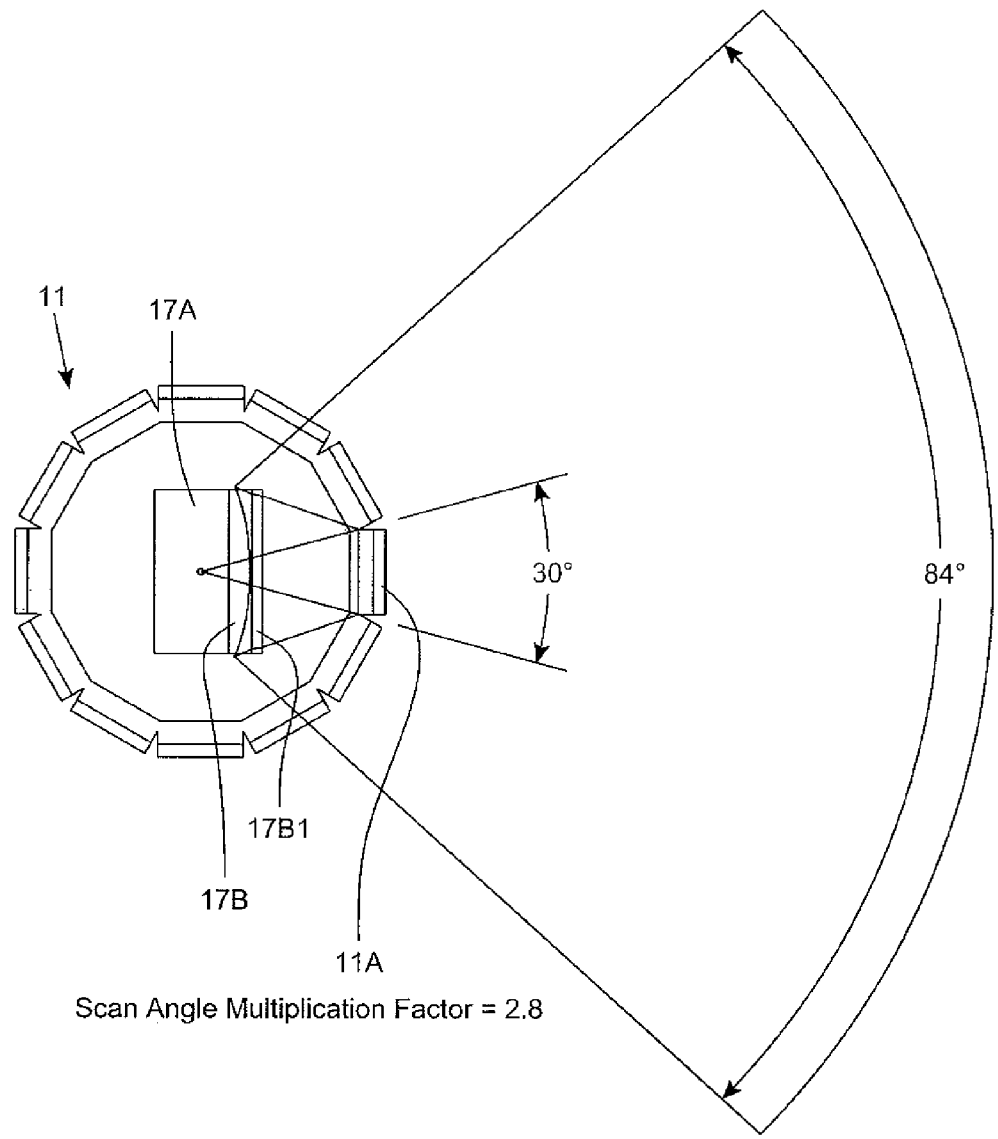
FIG. 4A is a plan view of the laser scanning assembly shown in FIG. 4, illustrating the first angular sweep (i.e. scanning angle) of the laser beam incident on the first (lower) rotating mirror as the first rotating mirror sweeps the laser beam across a single stationary cluster mirror, and also how the first angular sweep of the laser beam is amplified by the laser scanning assembly, so as to generate a greater second angular sweep (i.e. scan angle) of the laser beam, as the laser beam is directed from the stationary cluster mirror, onto the second rotating mirror, and reflects off the same out towards an object in the field of view, as both first and second rotating mirrors rotate together about their common axis of rotation during system operation.
Figure 4B:
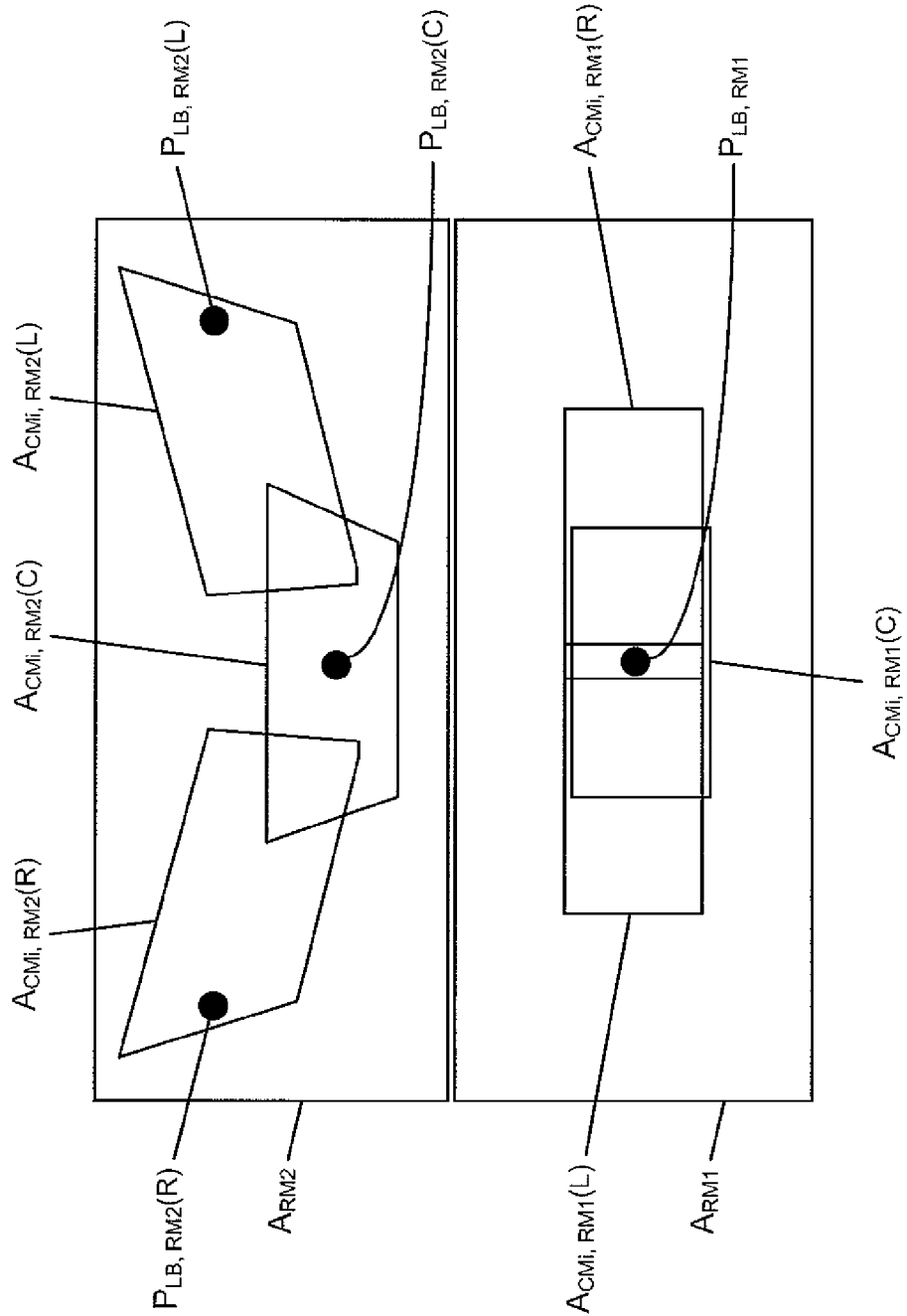
FIG. 4B is a schematic representation of the light collection apertures of the first and second rotating mirrors and a single cluster mirror in the stationary mirror array employed in the laser scanning assembly shown in FIG. 4, and the point of incidence of the laser beam with respect to the first and second rotating mirror during rotation of the laser scanning assembly.

FIG. 4A schematically illustrates two important functions performed by the rotating mirrors 17A, 17B employed in the laser scanning assembly of the illustrative embodiment. As illustrated in FIG. 4A, the first rotating mirror 17A sweeps the laser beam across a single stationary cluster mirror (11A). The first angular sweep (i.e. scanning angle) of the laser beam incident on the first (lower) rotating mirror 17A is about 30 degrees, as shown. FIG. 4A also illustrates that the first angular sweep of the laser beam 21A is subsequently amplified by the laser scanning assembly to generate a greater second angular sweep (i.e. scan angle) of the laser beam 21D of about 84 degrees. This amplification effect is achieved as the laser beam 21B is directed from the stationary cluster mirror 11A, onto the second rotating mirror 17B, and then laser beam 21C reflects off the second rotating mirror 11B out towards an object in the field of view (FOV) as both rotating mirrors 17A and 17B rotate together about their common axis of rotation during system operation. The total scan angle multiplication factor is equal to the scan angle produced (in this case 84 degrees) divided by the amount of mirror rotation required in order to produce said scan angle (in this case 30 degrees). As such, for FIG. 4A $K_{sam}$ is equal to 84/30 or 2.8.

The schematic diagram of FIG. 4B represents the spatial relationships among the light collection apertures of the first and second rotating mirrors 17A, 17B and each cluster mirror in the stationary mirror array 11 employed in the laser scanning assembly 10 shown in FIG. 4. In FIG. 4B, a number of important relationships are schematically illustrated relating to the light collection efficiency of the laser scanning assembly 10.

First, the point of incidence of the laser beam 21A, $P_{LB,RM1}$, is stationary with respect to the first rotating mirror 17A during the rotation of the rotating mirrors 17A, 17B, but it is always spatially contained within the light collection aperture of the i-th stationary cluster mirror 11.

Second, the laser beam 21B reflects off the i-th cluster mirror and towards the second rotating mirror 17B as the laser beam sweeps across the light collection aperture of the i-th cluster mirror (from the left, to the center, to the right of the cluster mirror $A_{CMi,RM1}(L)$, $A_{CMi,RM1}(C)$, and $A_{CMi,RM1}(R)$, respectively).

Third, the point of incidence of the laser beam $P_{LB,RM2}$ on the second rotating mirror moves with respect to the second rotating mirror 17B, but it is always spatially contained within the aperture of the stationary cluster mirror $A_{CMi,RM2}$.

Fourth, the light collection aperture of each i-th cluster mirror in the stationary array 11 $A_{CMi,RM1}(L)$, $A_{CMi,RM1}(C)$, and $A_{CMi,RM1}(R)$ is spatially contained within the light collection apertures of the first rotating mirror $A_{RM1}$ employed in the laser scanning assembly, as shown in FIG. 4B. Also, the light collection aperture of each i-th cluster mirror in the stationary array 11 $A_{CMi,RM2}(L)$, $A_{CMi,RM2}(C)$, and $A_{CMi,RM2}(R)$, for three representative positions, spatially intersects with the light collection aperture of the second rotating mirror $A_{RM2}$ employed in the laser scanning assembly.

Fifth, as indicated in FIG. 4B, the light collection aperture of each i-th cluster mirror in the stationary array 11, from the three representative positions, $A_{CMi,RM2}(L)$, $A_{CMi,RM2}(C)$, and $A_{CMi,RM2}(R)$, respectively, is skewed or keystoned in geometrical terms due to the rotational sweep and amplification of the scan angle of the incident laser beam 21A.

Sixth, the light collection aperture of each i-th cluster mirror $A_{CMi}$ is the limiting factor on the light collection efficiency of the laser scanning assembly 10 of the illustrated embodiment.

The above relationships must hold for the laser scanning assembly of the illustrative embodiment to collect light (i.e. photonic) energy returning from a laser beam scanned by the rotating mirrors 17A, 17B, in order to achieve an optimal level of light collection uniformity. This uniformity in light collection intensity (e.g. from a photo-detector (37, 40) employed with the laser scanning assembly 10' shown in FIG. 5) will be determined by several factor including the number of stationary cluster mirrors configured in the stationary array, and the distance of the scanned object from the laser scanning assembly 10, but not the scan angle multiplication factor of the laser scanning assembly, as defined hereinabove. When using 12 cluster mirrors in the stationary array 11 about the laser scanning assembly 10, the scan angle of each cluster mirror is 30 degrees, as included in FIG. 4A. To compute the light collection uniformity of the laser scanning assembly, the following formula is used:

Light Collection Uniformity=$\cos(\phi_1/2)$ where $\phi_1$ is the sweep angle off of the first rotating mirror.

Since each cluster mirror 11 intercepts 30 degrees of the laser beam sweep, the maximum incident sweep angle on any mirror is only 15 degrees. Notably, each stationary cluster mirror 11 is the limiting aperture of the collection optics for the laser scanning system (over its section of the 360 degree laser beam sweep). Thus, the light collection uniformity of the laser scanning assembly is computed using the equation $\cos(\phi_1/2)$, where $\phi_1=30$ degrees, to provide a figure of 0.966, indicating that the maximum loss in intensity in the laser beam sweep will be a mere 3.4%.

Figure 5:
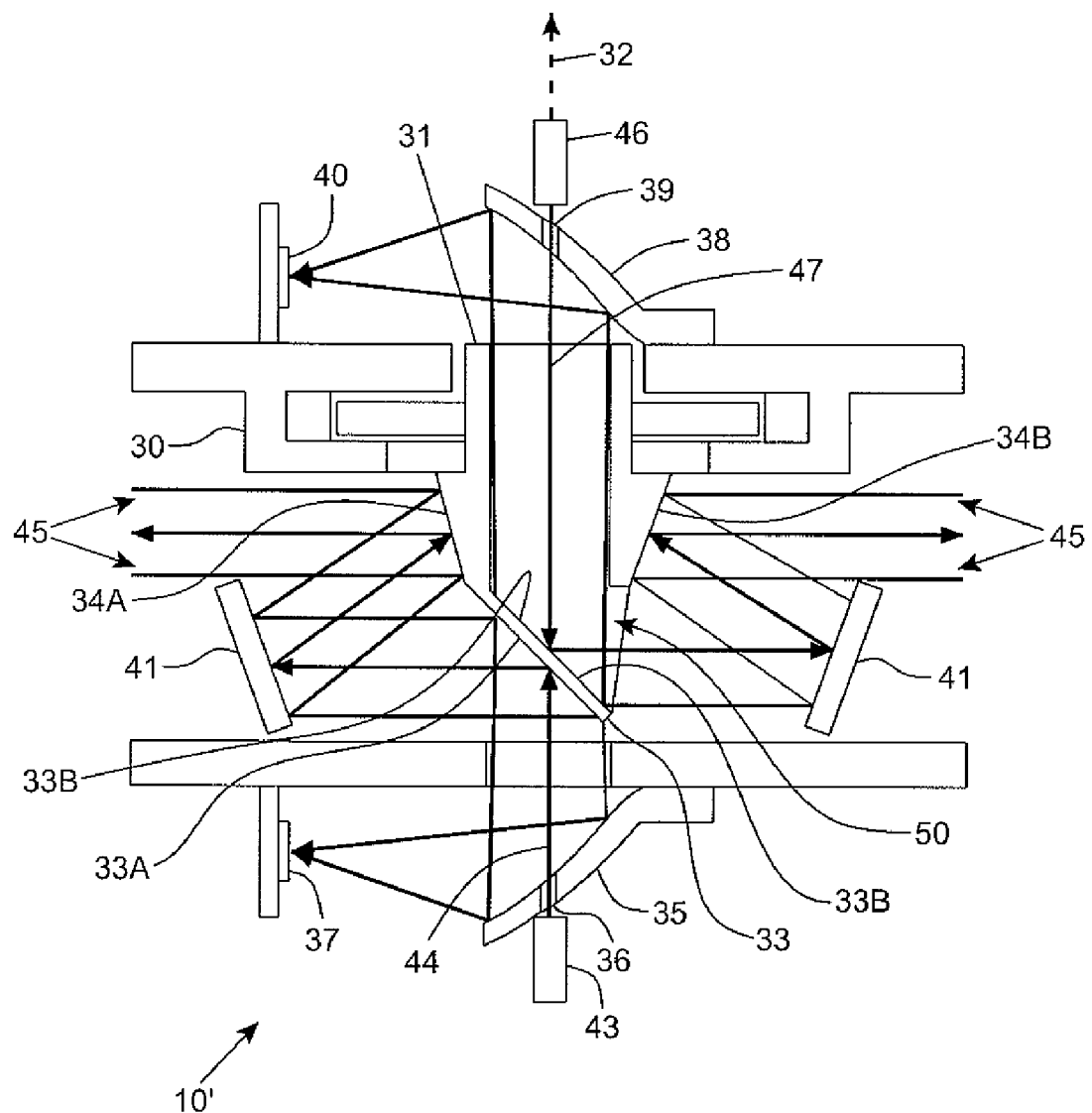
FIG. 5 is a schematic cross-sectional representation of a second embodiment of the laser scanning system, employing the laser scanning assembly of the second illustrative embodiment, configured in combination with a first cluster of stationary mirrors so as to generate a laser scanning pattern using a pair of laser beam sources that are directed along the axis of rotation of the laser scanning assembly.

Second Laser Scanning System Employing the Laser Scanning Assembly of the Second Illustrative Embodiment In FIG. 5, a second illustrative embodiment of the laser scanning assembly 10' is employed in a laser scanning system. As shown, the laser scanning assembly comprises: a motor 30 for rotating a mirror support structure 31 with a hollow center about an axis of rotation 32 and supporting a rotating double-side mirror 33 mounted along the axis of rotation 32 as shown, and pair of second rotating mirrors 34A and 34B disposed about the axis of rotation above the rotating double-sided rotating mirror 33.

As shown, a first light collection mirror 35 is provided with a first aperture 36 and a first photodiode 37 mounted below the motor 30. A second light collection mirror 38 is provided with a second aperture 39 and second photodiode 40 mounted above the motor 30. A first cluster of stationary mirrors 41 is arranged about the double-sided mirror 33 for reflecting laser scanning beams towards the pair of rotating mirrors 34A and 34B, in accordance with the principles disclosed herein.

A first laser source 43 generates a first laser beam 44 and directs the laser beam through the first aperture 36 along the axis of rotation, and off the first reflective surface 33A of the rotating double-sided mirror 33 and towards the first cluster of mirrors 41, and then reflects off the second reflective surface 34A and out towards a stationary array of beam folding mirrors (not shown in FIG. 5) and then off a scanned object, while return light rays 45 reflected and/or scattered off a scanned object and travel along the same optical path, focused by first collector mirror 35 towards the first photodetector 37.

Similarly, a second laser source 46 generates a second laser beam 47 and directs the laser beam through the second aperture 39 along the axis of rotation, and off the second reflective surface 33B of the rotating double-sided mirror 33 and through aperture 50 in the support structure 31 towards the first cluster of mirrors 41, and then reflects off the second reflective surface 34B and out towards a stationary array of beam folding mirrors (not shown in FIG. 5) and then off a scanned object, while return light rays 45 reflected and/or scattered off a scanned object travel along the same optical path, focused by second collector mirror 38 towards the second photodetector 40.

Using the above-described laser scanning arrangement, a laser scanning pattern is generated by the spinning laser scanning assembly 10' and driven by the pair of laser beam sources 43 and 46. Also, the scan angle multiplication factor for this scanning arrangement can be as high as 3.0, and its light collection efficiency as high as 0.966, for a marked improvement in scanning and light collection performance over conventional polygon and spinner type laser scanning methods.

In an alternative embodiment, the two laser beam sources 43 and 46 could be focused to different distances to improve the depth of field, or these laser beam sources could be focused the same in order to increase scan repetition rate. Also, the two laser beams 44 and 47 can also be generated by a single laser source, and then split by optical means. Alternatively, the bottom laser source 43 can be eliminated, and only the laser beam 47 from laser beam source 46 can be projected through the center of the motor 30 and the rotating support structure 31. Such an alternative embodiment could have advantages in the physical layout of the scanner.

Having described the illustrative embodiments, several variations and modifications readily come to mind.

While exemplary mirror angles have been disclosed in the illustrative embodiments, it is understood that different mirror angles could be used to achieve different raster patterns. For example, if all the cluster mirrors were angled identically, the three raster lines would be nearly superimposed, resulting in a higher repetition rate of roughly the same line.

Also, the initial laser beam (or beams) that is incident on the first mirror of the rotating pair could initially be reflected off of a wobbling mirror, scanning a narrow cone of light onto the rotating mirror pair and ultimately resulting in a lissajous pattern in the scanning field.

It is understood that the laser scanning assembly of the illustrative embodiments may be modified in a variety of ways which will become readily apparent to those skilled in the art in view of the novel teachings disclosed herein. All such modifications and variations of the illustrative embodiments thereof shall be deemed to be within the scope of the Claims appended hereto.

What is claimed is:

1. A laser scanning assembly comprising:
    first and second rotating mirrors supported on a support structure, rotatable about a common axis of rotation, by an electrical motor;
    wherein said first and second rotating mirrors have normal vectors that are coplanar with each other and said rotational axis, and which form an acute angle substantially less than 90 degrees so as to provide said laser scanning assembly with a scan angle multiplication factor that is greater than 2.0.

2. The laser scanning assembly of claim 1, which further comprises:
    a laser source for generating a laser beam and directing said laser beam along said rotational axis toward said first rotating mirror, reflecting off said first rotating mirror over to a stationary cluster of mirrors which produces a planar 360 degree sweep of said laser beam, and wherein said stationary cluster of mirrors intercepts said 360 degree sweep of said laser beam and reflects said laser beam up to said second rotating mirror, from which said laser beam is reflected off said second rotating mirror and exits outwardly towards a plurality of pattern forming mirrors, which generate a laser scanning pattern in a scan field.

3. The laser scanning assembly of claim 2, wherein laser light reflected and/or scattered off a bar code symbol in said scan field, returns along the same optical path of the exiting laser beam, reflecting off all the same mirrors in reverse order, at which point, the returned laser light is collected by a photo detector and processed by a scan data signal processor.

4. The laser scanning assembly of claim 1, wherein the angle of said first rotating mirror is approximately 45 degrees, measured with respect to said axis of rotation; and wherein said second rotating mirror is about 15 degrees, measured with respect to said axis of rotation.

5. The laser scanning assembly of claim 2, wherein said stationary cluster of mirrors comprises up of 12 mirrors of equal size, such that each mirror intercepts 30 degrees of said beam sweep.

6. The laser scanning assembly of claim 5, wherein each said stationary mirror is tilted at an angle around 15 degrees, specifically, mirrors 1, 4, 7, and 10 are oriented at 15 degrees, mirrors 2, 5, 8, and 11 are oriented at an angle slightly greater than 15 degrees, and mirrors 3, 6, 9 and 12 are oriented at an angle slightly less than 15 degrees.

7. The laser scanning assembly of claim 1, wherein the resulting total scan angle multiplication factor of said laser scanning assembly is approximately 2.8.

8. The laser scanning assembly of claim 1, wherein the resulting laser scanning pattern is an almost continuous, 360 degree raster of three scanning lines with one scanning line being broken approximately every 30 degrees.

9. The laser scanning assembly of claim 8, wherein said 360 degree raster of three scanning lines are intercepted by a second cluster of stationary pattern mirrors, disposed outside said first cluster of stationary mirrors, and directed out into said scan field in which a bar code symbol is present.

10. The laser scanning assembly of claim 7, wherein said scan angle multiplication factor of the rotating mirrors provides very a uniform beam motion through a full 360 degrees around the laser scanning assembly.

11. The laser scanning assembly of claim 7, wherein the scan angle multiplication factor of the rotating mirrors allows said laser scanning assembly to be physically larger than any individual cluster mirror, and consequently, allows the light collection to be nearly uniform with scan angle.

12. A laser scanning system for generating a laser scanning pattern while amplifying the scan-angle multiplication factor of rotating mirrors employed therein, said laser scanning system comprising:
    a rotatable laser scanning assembly having an axis of rotation and first and second rotating mirrors with normal vectors that are coplanar with each other and said rotational axis, and which form an acute angle substantially less than 90 degrees so as to improve said laser scanning system with a scan angle multiplication factor that is greater than 2.0; and
    a cluster of stationary mirrors mounted about said first and second rotating mirrors, for sweeping a laser beam off said cluster of stationary mirrors after, a laser beam has been reflected off said first rotating mirror, then reflected off said second rotating mirror, and then directed outwardly towards an array of pattern mirrors, so as to generate a resultant laser scanning pattern within a scanning field.

13. A laser scanning system comprising:
    a mirror support structure with a hollow center and supporting a double-side rotating mirror mounted along the axis of rotation, and pair of second rotating mirrors disposed about the axis of rotation above said double-sided rotating mirror;
    a motor for rotating said, mirror support structure about said axis of rotation;
    a first light collection mirror having a first aperture;

a first photodiode mounted below said motor;

a second light collection mirror having a second aperture;

a second photodiode mounted above said motor;

a first cluster of stationary mirrors arranged about said first rotating mirror for reflecting laser scanning beams towards said pair of second rotating mirrors.

14. The laser scanning system of claim 13, which further comprises:

a laser source for generating a first laser beam and directing said laser beam through said first aperture along said axis of rotation, and off the first surface of said double-sided mirror and out said first aperture towards said first cluster of mirrors, and then reflects off a second reflective surface and out towards a stationary array of beam folding mirrors and then off a scanned object, while return light rays off a scanned object travel along the same optical path, focused by said first collector mirror towards said first photodetector; and a second laser source for generating a second laser beam and directing said laser beam through said second aperture along the axis of rotation, and off said second surface of said double-sided mirror and towards said first cluster of mirrors, and then reflects off a second reflective surface and out towards a stationary array of beam folding mirrors and then off a scanned object, while return light rays off a scanned object travel along the same optical path, focused by said second collector mirror towards said second photo-detector.

15. The laser scanning system of claim 13, which further comprises:

a laser source for generating a laser beam and then splitting said laser beam into first and second laser beams, wherein said first laser beam is directed through said first aperture along said axis of rotation, and off the first surface of said double-sided mirror and out said first aperture towards said first cluster of mirrors, while return light rays off a scanned object travel along the same optical path, focused by said first collector mirror towards said first photodetector; and wherein said second laser beam is directed through said second aperture along the axis of rotation, and off said second surface of said double-sided mirror and towards said first cluster of mirrors, while return light rays off a scanned object travel along the same optical path, focused by said second collector mirror towards said second photodetector.

16. Method of generating a scanning pattern for scanning a bar code symbol within a scanning field, said method comprising the steps of:

(a) rotating a laser scanning assembly about an axis of rotation, wherein said laser scanning assembly has first and second rotating mirrors with normal vectors that are coplanar with each other and said rotational axis, and which form an acute angle substantially less than 90 degrees so as to provide said laser scanning assembly with a scan angle multiplication factor that is greater than 2.0;

(b) directing a laser beam onto said first rotating mirror as said first and second rotating mirror rotate about said axis of rotation;

(c) said first rotating mirror reflectively sweeping the reflected laser beam off a cluster of stationary mirrors mounted about said first and second rotating mirrors;

(d) said cluster of stationary mirrors reflecting the laser beam towards said second rotating mirror;

(e) said second rotating mirror reflectively sweeping the laser beam outwardly towards an array of stationary pattern mirrors;

(f) said array of stationary pattern mirrors reflecting the laser beam so as to generate a resultant laser scanning pattern within the scanning field.

\* \* \* \* \*